Nov. 19, 1968     H. K. ANDREWS ETAL     3,411,816
DOUBLE SEALING NUT
Filed Nov. 22, 1966
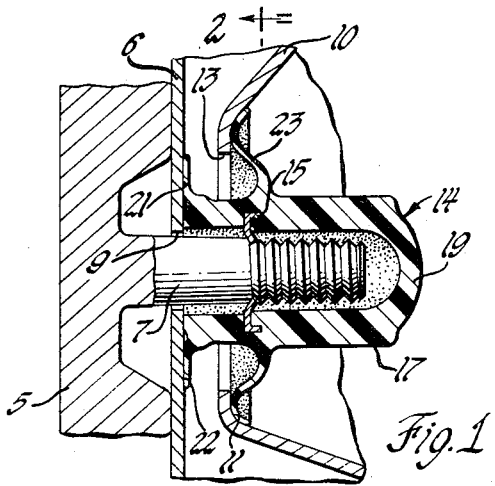
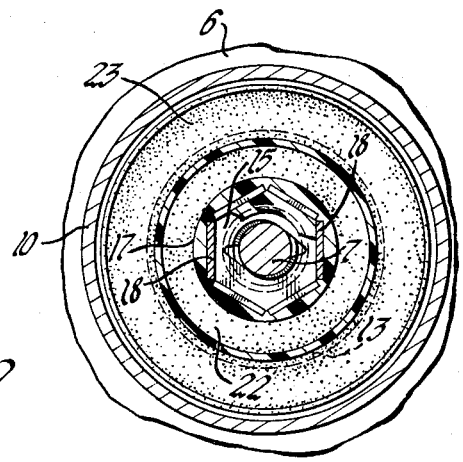
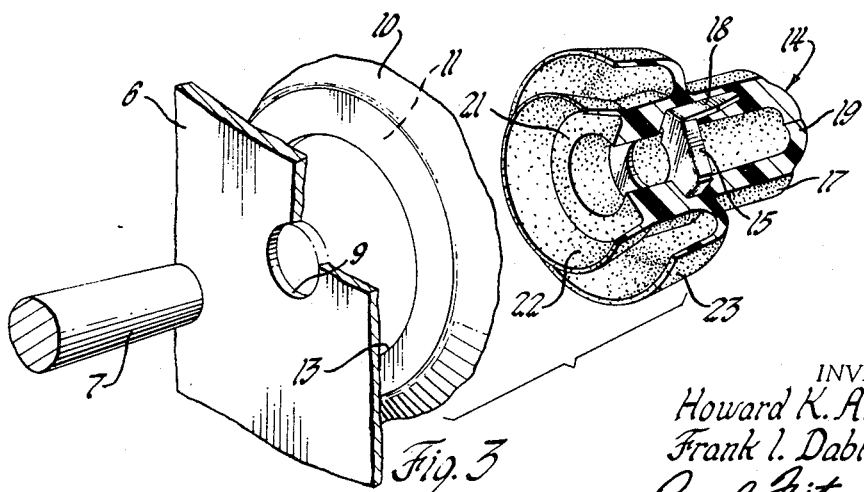
INVENTORS
Howard K. Andrews, &
Frank I. Dabkowski
Paul Fitzpatrick
ATTORNEY 3,411,816
DOUBLE SEALING NUT
Howard K. Andrews, Grosse Pointe Woods, and Frank I. Dabkowski, Livonia, Mich., assignors to General Motors Corporation, Detroit, Mich., a corporation of Delaware
Filed Nov. 22, 1966, Ser. No. 596,179
5 Claims. (Cl. 287—189.36)

ABSTRACT OF THE DISCLOSURE

An arrangement to fasten a body against a double-walled structure including a nut having two diverging resilient flanges one adapted to seat against each of the walls.

---

Our invention relates to fasteners and particularly to a nut including structure adapted to seal against two surfaces spaced axially of the nut. The particular use for which our fastener is directed is that of fastening trim items to the exterior of a double-walled structure such as an automobile rear deck lid, while sealing against both walls of the lid. No doubt, however, the principles and preferred structure of our fastener are useful for other purposes.

The principal objects of our invention are to provide a fastener such as a nut including structure adapted to seal against two surfaces spaced along the axis of the nut, to provide a nut having two flexible sealing flanges extending from the body of the nut, and to provide a self-threading fastener satisfying the above-mentioned objects.

The nature and advantages of our invention will be clear to those skilled in the art from the succeeding description and appended drawings of the preferred embodiment thereof.

FIGURE 1 is a sectional view of a fastener in seated position taken in a plane containing the axis of the fastener;

FIGURE 2 is a cross-sectional view taken on the plane indicated in FIGURE 1;

FIGURE 3 is a composite axonometric view of a fastener installation, with parts cut away.

The drawings illustrate the application of our fastener (hereafter referred to as a nut) to the retention of an emblem or the like on a double-walled structure such as the rear deck lid of an automobile.

The emblem body 5 is seated against the outer panel 6 of the deck lid. It is retained by one or more studs 7 integral with the emblem body extending through holes 9 in the panel. The deck lid also includes an inner panel 10 spaced from the outer panel. The inner panel defines a seating surface 11 around a hole 13 aligned with the hole 9. Hole 13 is considerably larger than hole 9.

A nut 14 according to our invention threads onto stud 7 and includes flexible flanges sealing against panels 6 and 10. As illustrated, the nut is of a self-threading type including a sheet metal nut 15 of known type molded into the plastic body 17 of the nut. The sheet metal nut includes projections 18 embedded in the plastic as the nut is molded. The nut body is preferably of polypropylene or other plastic material of similar properties. The body 17 may have a hexahedral exterior surface for wrench application and a closed rear end 19. The nut has a forward face 21 adapted to bear against the panel 6.

For sealing purposes, the nut includes two radially and forwardly directed flexible flanges, a first flange 22 which seats against panel 6 and a second flange 23 which seats against panel 10. The normal or free shape of these flanges is apparent from FIGURE 3. When the nut is tightened, the flanges are flattened against the panels as shown in FIGURE 1 and remain elastically pressed against the panels to shut out dust and the like. The sealing is effective notwithstanding considerable latitude in the spacing of the two panels because of the flexibility and conical contour of the flanges 22 and 23.

The polypropylene is sufficiently rigid to serve as a nut body and also sufficiently flexible, in the thin section of the flanges 21 and 22, to yield as the nut is tightened and thus bear against the panels in sealing relation. The flanges may be about 0.012" thick.

To install the emblem 5, it is abutted against panel 6, and nuts 14 are threaded upon the studs 7 until the face 21 bottoms against panel 6. Flanges 22 and 23 yield and spread and remain elastically seated against panels 6 and 10, respectively. Hole 13 is large enough to pass flange 22 in its relaxed state. Flange 23 is of larger diameter than flange 22 so as to engage panel 10.

The description of the preferred embodiment of the invention for the purpose of explaining the principles thereof is not to be considered as limiting or restricting the invention, since many modifications may be made by the exercise of skill in the art.

We claim:
1. An installation comprising, in combination, a base including first and second mutually spaced panels having aligned holes through the panels; a device seated against the outer surface of the first panel; a stud extending from the device through the hole in the first panel; and a nut including a body extending through the hole in the second panel and having internal threads threaded onto the stud, the nut having a forward face adapted to seat against the inner surface of the first panel and having a first flexible sealing flange extending from the nut forwardly and radially outwardly from the nut around the forward face in position to be elastically deformed rearwardly and outwardly of the nut by engagement with the inner face of the first panel and to remain in resilient seated engagement with the inner face of the first panel, the nut including a second flexible sealing flange extending forwardly and radially from the nut more remote from the forward face than the first flange in position to be elastically deformed rearwardly and outwardly of the nut by engagement with the second panel and to remain in resilient seated engagement with the face of the second panel remote from the first panel; the hole in the second panel being sufficiently large to pass the first flange.

2. An installation as recited in claim 1 in which the body and flanges are of a flexible plastic, and including a rigid threaded part embedded in the body.

3. An installation as recited in claim 2 in which the threaded part is adapted to form threads on an unthreaded stud.

4. An installation as recited in claim 1 in which the body and flanges are of a flexible plastic.

5. An installation as recited in claim 4 in which the body and flanges are of polypropylene.

References Cited

UNITED STATES PATENTS

| | | | |
|---|---|---|---|
| 2,054,965 | 9/1936 | Clo | 85—32 |
| 2,417,262 | 3/1947 | Morehouse | 85—36 |
| 3,273,441 | 9/1966 | Biesecker | 85—35 |
| 3,345,899 | 10/1967 | Fiddler | 85—35 |

EDWARD C. ALLEN, *Primary Examiner.*